United States Patent
Onoyama et al.

(10) Patent No.: US 7,514,123 B2
(45) Date of Patent: Apr. 7, 2009

(54) WHITE CONDUCTIVE PRIMER COATING COMPOSITION AND METHOD OF FORMING MULTILAYERED COATING FILM

(75) Inventors: Hiroyuki Onoyama, Chigasaki (JP); Yasuyuki Kataoka, Hiratsuka (JP); Shuichi Nakahara, Hiratsuka (JP); Yoshizumi Matsuno, Hadano (JP)

(73) Assignee: Kansai Paint Co., Ltd., Amagasaki-Shi (JP)

( * ) Notice: Subject to any disclaimer, the term of this patent is extended or adjusted under 35 U.S.C. 154(b) by 635 days.

(21) Appl. No.: 10/546,807

(22) PCT Filed: Mar. 4, 2004

(86) PCT No.: PCT/JP2004/002745

§ 371 (c)(1),
(2), (4) Date: Aug. 25, 2005

(87) PCT Pub. No.: WO2004/078861

PCT Pub. Date: Sep. 16, 2004

(65) Prior Publication Data

US 2006/0219980 A1 Oct. 5, 2006

(30) Foreign Application Priority Data

Mar. 4, 2003 (JP) .............................. 2003-057146

(51) Int. Cl.
*B05D 1/04* (2006.01)
*B05D 1/36* (2006.01)
*C08K 3/10* (2006.01)

(52) U.S. Cl. ...................... 427/475; 427/485; 524/783; 524/547

(58) Field of Classification Search ........................ None
See application file for complete search history.

(56) References Cited

U.S. PATENT DOCUMENTS

| 5,242,716 | A | 9/1993 | Iwase et al. ............... 427/407.1 |
| 6,344,500 | B1 | 2/2002 | Ogawa et al. ............... 523/407 |
| 2003/0194500 | A1* | 10/2003 | Masuda et al. ........... 427/407.1 |
| 2003/0229179 | A1* | 12/2003 | Merritt et al. ............. 525/92 K |

FOREIGN PATENT DOCUMENTS

| DE | 10148055 | 7/2002 |
| GB | 2359555 | 8/2001 |
| JP | 58-017174 | 2/1983 |
| JP | 58-17174 | 2/1983 |
| JP | 58-167658 | 10/1983 |
| JP | 2000-007340 | 1/2000 |
| JP | 2001-311047 | 11/2001 |
| JP | 2002-179948 | * 6/2002 |

OTHER PUBLICATIONS

International Search Report dated Jun. 1, 2004.
European Search Report dated Apr. 10, 2006.

* cited by examiner

*Primary Examiner*—Frederick J Parker
(74) *Attorney, Agent, or Firm*—Kratz, Quintos & Hanson, LLP

(57) ABSTRACT

A white conductive primer coating composition comprising (a) 100 parts by total weight of a chlorinated polyolefin resin with a chlorine content of 10 to 40 wt. % and at least one modifier resin selected from the group consisting of acrylic resins, polyester resins and polyurethane resins, (b) 5 to 50 parts by weight of a crosslinking agent, and (c) 10 to 200 parts by weight of a white conductive powder comprising white inorganic pigment particles having a tin dioxide covering layer containing tungsten; and a method of forming a multilayer coating film using the composition.

8 Claims, No Drawings

WHITE CONDUCTIVE PRIMER COATING COMPOSITION AND METHOD OF FORMING MULTILAYERED COATING FILM

TECHNICAL FIELD

The present invention relates to a white conductive primer coating composition and a method of forming a multilayer coating film.

BACKGROUND ART

Automotive bumpers and like plastic substrates are generally coated by spray coating, such as air spray coating or airless spray coating. In recent years, however, electrostatic coating, which shows excellent deposition efficiency and thus emits only a small amount of environmentally harmful substances, has been finding wider application.

Since plastic substrates generally have high electrical resistance (usually about $10^{12}$ to about $10^{16}$ Ω/sq.), it is extremely difficult to electrostatically apply a paint to plastic substrate surfaces directly. Therefore, before electrostatic application, conductivity is imparted to plastic substrates themselves or their surfaces so that the substrates have a surface electrical resistance below $10^9$ Ω/sq.

For example, before electrostatic application of a paint to a plastic substrate, a conductive primer may be applied to impart conductivity to the substrate. A coating material containing a resin component and conductive filler is conventionally used as such a conductive primer.

Particles of conductive carbon, metals, conductive metal oxides, etc. have been heretofore used as conductive fillers. The form or shape of such conductive filler particles is usually a powder, needles, fibers, spheres or the like.

When a carbon powder or carbon fibers are added to a coating material as a conductive filler, although a relatively small amount can impart conductivity, the resulting coating layer has reduced whiteness, i.e., reduced brightness, and thus affects the color properties, such as brightness, of the upper coating layer to be formed thereon.

Metal powders have high conductivity, but need to be added in large amounts, since the particles of metal powders need to be in contact with one another to form an electrical conduction path in a coating layer. Thus, use of a metal powder as a conductive filler impairs the whiteness of the coating layer and stability of the coating material.

Japanese Unexamined Patent Publication No. 2001-311047 proposes a conductive coating composition containing a specific sulfonium salt compound. Reportedly, this composition can make plastic substrates suitable for electrostatic coating, and has little influence on the color tone of the upper coating layer when forming a multilayer coating film.

However, the sulfonium salt compound in this coating composition adversely affects the environment when baking the coating of the composition or recycling the coated plastic substrates. Further, the coating film formed from the composition has insufficient whiteness.

Japanese Unexamined Patent Publication No. 2002-179948 proposes a conductive resin composition prepared by blending, with a resin, a white conductive powder comprising white inorganic pigment particles having on their surfaces a tin dioxide covering layer containing tungsten.

However, this publication does not describe a specific formulation of the conductive resin composition, and mentions nothing about primer coating compositions. Thus, it cannot be known what formulation of the white conductive powder, when used, gives a conductive primer coating composition that can form, on a plastic substrate, a coating layer with high brightness and sufficient conductivity for electrostatic application of an upper coating layer thereto.

DISCLOSURE OF THE INVENTION

An object of the present invention is to provide a white conductive primer coating composition that can form a coating layer with sufficient conductivity and high brightness on a plastic substrate.

Another object of the present invention is to provide a method of forming a multilayer coating film on a plastic substrate using the primer coating composition.

The present inventors conducted extensive research to develop a white conductive primer coating composition that can form a coating layer with sufficient conductivity and high brightness on a plastic substrate.

As a result, the inventors found that when a white conductive powder comprising white inorganic pigment particles having on their surfaces a tin dioxide covering layer containing tungsten is blended as a conductive filler with a specific chlorinated polyolefin resin, specific modifier resin and crosslinking agent, the resulting primer coating composition can impart sufficient conductivity to plastic substrates, thus allowing another coating composition to be electrostatically applied over the coating layer of the primer coating composition; and the coating layer of the primer coating composition has high brightness. The present invention was accomplished based on these new findings.

The present invention provides the following white conductive primer coating compositions and methods of forming a multilayer coating film using the composition.

1. A white conductive primer coating composition comprising:

(a) 100 parts by total weight of a chlorinated polyolefin resin with a chlorine content of 10 to 40 wt. %, and at least one modifier resin selected from the group consisting of acrylic resins, polyester resins and polyurethane resins;

(b) 5 to 50 parts by weight of a crosslinking agent; and (c) 10 to 200 parts by weight of a white conductive powder comprising white inorganic pigment particles having on their surfaces a tin dioxide covering layer containing tungsten.

2. A primer coating composition according to item 1, wherein, in the component (a), the proportions of the chlorinated polyolefin resin and modifier resin are 10 to 90 wt. % and 90 to 10 wt. %, respectively, of the total of these resins.

3. A primer coating composition according to item 1, wherein the white conductive powder (c) comprises white inorganic pigment particles having a tin dioxide layer on their surfaces and a tin dioxide covering layer containing tungsten on the tin dioxide layer.

4. A primer coating composition according to item 1, wherein, in the white conductive powder (c), the proportion of the tungsten-containing tin dioxide covering layer is 3 to 150 wt. % on a tin dioxide basis, relative to the weight of white inorganic pigment.

5. A primer coating composition according to item 4, wherein, in the tungsten-containing tin dioxide covering layer in the white conductive powder (c), the proportion of tungsten is 0.1 to 20 wt. % relative to the weight of tin dioxide.

6. A primer coating composition according to item 1, further comprising (d) up to 200 parts by weight of a white pigment.

7. A primer coating composition according to item 1, the composition being capable of forming a coating with a lightness (L* value) of 80 or more as determined according to the L*a*b* color system defined in JIS Z 8729, by being applied to a plastic substrate and cured by heating.

8. A primer coating composition according to item 1, the composition, when formed into an uncured or cured coating applied on a plastic substrate, having a surface electrical resistance of less than $10^9$ Ω/sq.

9. A primer coating composition according to item 1, which is an aqueous coating composition.

10. A 3-coat 1-bake method of forming a multilayer coating film, the method comprising the steps of:

(1) applying a white conductive primer coating composition according to item 1 to a plastic substrate;

(2) electrostatically applying a colored base coating composition on the uncured coating layer of the primer coating composition;

(3) electrostatically applying a clear coating composition on the uncured coating layer of the base coating composition; and then (4) curing by heating the three-layer coating comprising the primer coating composition, colored base coating composition and clear coating composition.

11. A 3-coat 2-bake method of forming a multilayer coating film, the method comprising the steps of:

(1) applying a white conductive primer coating composition according to item 1 to a plastic substrate, followed by curing by heating;

(2) electrostatically applying a colored base coating composition on the cured coating layer of the primer coating composition;

(3) electrostatically applying a clear coating composition on the uncured coating layer of the base coating composition; and then (4) curing by heating the two-layer coating comprising the colored base coating composition and clear coating composition.

White Conductive Primer Coating Composition

The white conductive primer coating composition of the present invention is an aqueous or organic solvent-based coating composition comprising specific amounts of (a) a mixture of a chlorinated polyolefin resin with a chlorine content of 10 to 40 wt. %, and at least one modifier resin selected from the group consisting of acrylic resins, polyester resins and polyurethane resins; (b) a crosslinking agent; and (c) a white conductive powder comprising white inorganic pigment particles having on their surfaces a tin dioxide covering layer containing tungsten.

Chlorinated Polyolefin Resin/Modifier Resin Mixture (a)

A mixture of a chlorinated polyolefin resin and specific modifier resin(s) is used as a resin component of the white conductive primer coating composition of the present invention. The chlorinated polyolefin resin is used to improve the adhesion of the coating layer, and the modifier resin(s) is used to adjust the flexibility, stiffness and other properties of the coating layer and improve the film-forming properties.

Chlorinated Polyolefin Resin

The chlorinated polyolefin resin is a chlorination product of a polyolefin. Examples of usable base polyolefins include radical homopolymers and copolymers of at least one olefin selected from ethylene, propylene, butene, methylbutene, isoprene, etc.; and radical copolymers of such olefins with vinyl acetate, butadiene, acrylic ester, methacrylic ester, etc. The chlorinated polyolefin may usually have a weight average molecular weight of about 30,000 to about 200,000, especially about 50,000 to about 150,000.

The chlorine content of the chlorinated polyolefin resin is about 10 to about 40 wt. %. Chlorine contents within the above range do not impair the solubility in solvents, and thus the coating composition can be sufficiently atomized during spray coating. Further, such chlorine contents do not reduce the solvent resistance of the resulting coating layer. A preferable chlorine content is about 12 to about 35 wt. %.

Examples of preferable chlorinated polyolefin resins include chlorinated polyethylene, chlorinated polypropylene, chlorinated ethylene-propylene copolymers, chlorinated ethylene-vinyl acetate copolymers, etc. Also usable are resins obtained by graft polymerization of chlorinated polyolefins with polymerizable monomers.

Examples of polymerizable monomers usable for such graft polymerization include alkyl (meth)acrylates, alkoxyalkyl (meth)acrylates, glycidyl (meth)acrylates, adducts of glycidyl (meth)acrylates with monocarboxylic acids, hydroxyalkyl (meth)acrylates, acrylic acid, methacrylic acid, etc. The proportion of such polymerizable monomer(s) to be used is not limited as long as gelation does not occur, and is preferably about 10 to about 80 wt. %, and more preferably about 30 to about 60 wt. %, relative to the chlorinated polyolefin.

When the primer coating composition of the present invention is aqueous, in order to make the chlorinated polyolefin resin water-dispersible, one or more hydrophilic monomers, such as a polymerizable unsaturated dicarboxylic acid or an anhydride thereof, may be graft-polymerized to the chlorinated polyolefin by a known method.

Polymerizable unsaturated dicarboxylic acids and anhydrides thereof are compounds having one polymerizable unsaturated bond and two or more carboxy groups per molecule, or anhydrides thereof. Examples include maleic acid and its anhydride, itaconic acid and its anhydride, citraconic acid and its anhydride, etc. The proportion of such hydrophilic monomer(s) is preferably about 1 to about 60 wt. %, and more preferably about 1.5 to about 40 wt. %, relative to the chlorinated polyolefin.

The graft polymerization of the monomer(s) to the chlorinated polyolefin resin can be performed by a known method. The modified chlorinated polyolefin obtained by using the above-mentioned proportion of polymerizable unsaturated dicarboxylic acid or anhydride thereof usually has a saponification value of about 10 to about 60 mg KOH/g, especially about 20 to about 50 mg KOH/g.

In a chlorinated polyolefin resin to which a polymerizable unsaturated dicarboxylic acid or an anhydride thereof has been graft-polymerized as described above, it is preferable that part or all of the carboxy groups be neutralized with an amine compound to render the chlorinated polyolefin resin water-soluble or water-dispersible.

Examples of amine compounds include triethylamine, tributylamine, dimethylethanolamine, triethanolamine and other tertiary amines; dimethylamine, dibutylamine, diethanolamine and other secondary amines; etc. To impart water solubility or water dispersibility, such amine compounds can be used in combination with surfactants.

Modifier Resin

In the resin component of the white conductive primer coating composition of the present invention, a modifier resin is used in combination with the chlorinated polyolefin resin for adjusting the flexibility, stiffness, etc. of the coating layer, improving the film-forming properties, and other purposes. At least one member selected from the group consisting of acrylic resins, polyester resins and polyurethane resins is used as the modifier resin.

In view of the balance between adhesion of the coating layer and modification effects, the proportions of the chlorinated polyolefin resin and the modifier resin are preferably about 10 to about 90 wt. % and about 90 to about 10 wt. %, respectively, of the total of these resins. More preferable proportions are about 20 to 70 wt. % of the chlorinated polyolefin resin and about 80 to about 30 wt. % of the modifier resin.

Hydroxy-containing acrylic resins are preferable as acrylic resins for use as modifier resins. When the primer coating composition of the present invention is aqueous, it is preferable to use a hydroxy-containing acrylic resin containing, as well as hydroxy groups, carboxy groups to impart solubility or dispersibility in water, crosslinkability, etc.

Hydroxy-containing acrylic resins can be obtained by polymerizing a hydroxy-containing monomer, alkyl (meth)acrylate monomer, and optionally other monomers, by a known polymerization method, such as a solution polymerization method or the like.

Hydroxy-containing monomers are compounds having a hydroxy group and polymerizable unsaturated group. Examples thereof include hydroxyethyl (meth)acrylate, hydroxypropyl (meth)acrylate, hydroxybutyl (meth)acrylate, other monoesters of (meth)acrylic acid with $C_{2-10}$ diols, etc.

Examples of alkyl (meth)acrylate monomers include methyl (meth)acrylate, ethyl (meth)acrylate, propyl (meth)acrylate, butyl (meth)acrylate, hexyl (meth)acrylate, 2-ethylhexyl (meth)acrylate, lauryl (meth)acrylate, stearyl (meth)acrylate, other monoesters of (meth)acrylic acid with $C_{1-20}$ monohydric alcohols, etc.

The other monomers are compounds that are other than hydroxy-containing monomers and alkyl (meth)acrylate monomers and have a polymerizable unsaturated bond. Examples of such monomers include (meth)acrylic acid, maleic acid and other carboxy-containing monomers; glycidyl (meth)acrylate and other epoxy-containing monomers; (meth)acrylamide, acrylonitrile, styrene, vinyl acetate, vinyl chloride, etc.

It is usually suitable that such hydroxy-containing acrylic resins have a hydroxy value of about 10 to about 100 mg KOH/g, and preferably about 50 to about 90 mg KOH/g; an acid value of about 10 to 100 mg KOH/g, and preferably about 30 to about 60 mg KOH/g; and a number average molecular weight of about 2,000 to about 100,000, and preferably about 3,000 to about 50,000.

Polyester resins for use as modifier resins can usually be obtained by an esterification reaction of a polybasic acid with a polyhydric alcohol. Polybasic acids are compounds having two or more carboxy groups per molecule (their anhydrides are also included); and polyhydric alcohols are compounds having two or more hydroxy groups per molecule. Conventionally used polybasic acids and polyhydric alcohols are usable. Also usable are those modified with a monobasic acid, higher fatty acid, oil component, etc.

Such polyester resins may have hydroxy groups, which can be introduced by using a divalent alcohol in combination with a trivalent or higher alcohol. The polyester resins may have carboxy groups as well as hydroxy groups, and it is usually suitable that the polyester resins have a weight average molecular weight of 1,000 to about 100,000, and preferably about 1,500 to about 70,000.

Preferable polyurethane resins for use as modifier resins are those obtained by reacting a polyhydroxy compound, a polyisocyanate compound and a compound having one active hydrogen atom per molecule. It is usually suitable that the polyurethane resins have a number average molecular weight of about 400 to about 10,000, and preferably about 1,000 to about 4,000.

It is preferable that the polyhydroxy compound have at least two alcoholic hydroxy groups per molecule; a number average molecular weight of about 50 to about 8,000, and particularly about 50 to about 6,000; and a hydroxy equivalent of about 25 to about 4,000, and particularly about 25 to about 3,000. Examples of such compounds include polyhydric alcohols; various polyester polyols and polyether polyols conventionally used for producing polyurethane resins; mixtures thereof; etc.

Polyisocyanate compounds are compounds having two or more, and preferably two or three, isocyanate groups per molecule. Examples of such compounds include aliphatic polyisocyanate compounds, alicyclic polyisocyanate compounds, aromatic polyisocyanate compounds, and other compounds conventionally used for producing polyurethane resins.

The compound having one active hydrogen atom per molecule is used for blocking isocyanate groups in the polyisocyanate compound. Examples of such compounds include methanol, ethanol, diethylene glycol monobutyl ether and other monohydric alcohols; acetic acid, propionic acid and other monocarboxylic acids; ethyl mercaptan and other monothiols; diethylenetriamine, monoethanolamine and other primary amines; diethylamine and other secondary amines; methyl ethyl ketoxime and other oximes; etc.

When the primer coating composition of the present invention is aqueous, a hydrophilic polyurethane resin that can be dissolved or dispersed in water is preferable as a polyurethane resin for use as a modifier resin.

Hydrophilic polyurethane resins can be obtained, for example, by extending and emulsifying, after or while being neutralized, a urethane prepolymer obtained by reacting, by a one-shot or multistage process, an aliphatic and/or alicyclic diisocyanate, diol with a number average molecular weight of about 500 to about 5,000, a low-molecular-weight polyhydroxyl compound and a dimethylolalkanoic acid. Particularly preferable is a self-emulsifiable urethane resin with a mean particle diameter of about 0.001 to about 1 µm, obtained by distilling off some or all of the organic solvent used in the production process.

Commercial products of polyurethane resins can be used, including, for example, "Takelac W610" (a tradename of Takeda Pharmaceutical Co., Ltd.), "Neorez R960" (a tradename of Zeneca Resins Ltd.), "Sanprene UX-5100A" (a tradename of Sanyo Chemical Industries, Ltd.), etc.

Crosslinking Agent (b)

The white conductive primer coating composition of the present invention contains a crosslinking agent together with the above resin component to improve the film performance characteristics, such as water resistance, and is used as a thermosetting coating composition.

Usable crosslinking agents include polyisocyanate compounds with unreacted isocyanate groups; blocked polyisocyanate compounds obtained by blocking isocyanate groups of polyisocyanate compounds with blocking agents; melamine resins; epoxy resins; carbodiimide resins; oxazoline compounds; etc.

Examples of polyisocyanate compounds with unreacted isocyanate groups include tolylene diisocyanate (TDI), 4,4'-diphenylmethane diisocyanate (MDI), xylylene diisocyanate (XDI), metaxylylene diisocyanate (MXDI) and other aromatic diisocyanates; hexamethylene diisocyanate (HDI) and other aliphatic diisocyanates; isophorone diisocyanate (IPDI), hydrogenated MDI and other alicyclic diisocyanates; such diisocyanate compounds in a fixed and less toxic form; biurets, uretdiones, isocyanurates and adducts of such diisocyanate compounds; relatively low-molecular-weight urethane prepolymers; and other polyisocyanate compounds.

When the primer coating composition of the present invention is aqueous, it is preferable to use a polyisocyanate compound as hydrophilized. Polyisocyanate compounds can be hydrophilized, for example, by introducing at least one hydrophilic group into the compounds, which are then neutralized with a neutralizing agent. Examples of usable hydrophilic groups include carboxy groups, sulfonic acid groups, tertiary amino groups and the like, and examples of usable neutralizing agents include dimethylol propionic acid and like hydroxycarboxylic acids, ammonia, tertiary amine and the like. A surfactant may also be mixed with polyisocyanate compounds for emulsification, to prepare so-called self-emulsifiable polyisocyanate compounds.

Commercial products of hydrophilic polyisocyanate compounds are usable, including, for example, "Bayhydur 3100" (a tradename of Sumika Bayer Urethane Co., Ltd., a hydrophilized isocyanurate of hexamethylene diisocyanate) and the like.

Blocked polyisocyanate compounds can be obtained by blocking isocyanate groups of a polyisocyanate compound with a blocking agent.

Usable blocking agents include ε-caprolactam, γ-butyrolactam and other lactam compounds; methyl ethyl ketoxime, cyclohexanone oxime and other oxime compounds; phenol, para-t-butylphenol, cresol and other phenol compounds; n-butanol, 2-ethylhexanol and other aliphatic alcohols; phenylcarbinol, methylphenylcarbinol and other aromatic alkyl alcohols; ethylene glycol monobutyl ether and other ether alcohol compounds; etc.

Blocked polyisocyanate compounds may be obtained by blocking a polyisocyanate compound with a blocking agent and then dispersing the blocked product in water using a suitable emulsifier and/or protective colloid agent, since such a blocked product is usually hydrophobic.

Examples of melamine resins include methylolated melamine resins obtained by reacting melamines with formaldehyde; partially or fully etherified melamine resins obtained by reacting methylolated melamine resins with $C_{1-10}$ monohydric alcohols; etc. Such melamine resins may contain imino groups. The melamine resins may be hydrophobic or hydrophilic. Especially suitable are hydrophilic, methyl-etherified melamine resins with a low degree of condensation and a number molecular weight less than about 3,000, particularly about 300 to about 1,500. Examples of commercial products of such hydrophilic melamine resins include "Cymel 303", "Cymel 325" (tradenames of Cytec Industries, Inc.), etc.

Epoxy resins have two or more epoxy groups per molecule, and are effective for crosslinking and curing chlorinated polyolefins, acrylic resins, polyester resins, polyurethane resins and like resins, all having carboxy groups.

Examples of epoxy resins include copolymers of epoxy-containing polymerizable monomers and polymerizable vinyl monomers. Examples of epoxy-containing polymerizable monomers include glycidyl acrylate, glycidyl methacrylate, methyl glycidyl acrylate, methyl glycidyl methacrylate, etc. Polymerizable vinyl monomers are those other than epoxy-containing polymerizable monomers, and include, for example, alkyl (meth)acrylates, acrylonitrile, styrene, vinyl acetate, vinyl chloride, etc. The copolymerization reaction of such monomers can be performed by a known process, and it is preferable that the obtained polymer have an epoxy equivalent of about 200 to about 2,800, and especially about 300 to about 700, and a number average molecular weight of about 3,000 to about 100,000, and especially about 4,000 to about 50,000.

Also usable as the crosslinking agent are epoxy resins such as glycidyl-etherified bisphenols; hydrogenated products thereof; glycidyl-etherified aliphatic polyhydric alcohols; glycidyl ester-type epoxy resins; alicyclic epoxy resins; etc. Such epoxy resins preferably have a molecular weight of about 250 to about 20,000, and especially about 300 to about 5,000.

Commercial products of carbodiimide resins can be used, including, for example, "Carbodilite E-01", "Carbodilite E-02" (tradenames of Nisshinbo Industries, Inc.), etc.

Oxazoline compounds are hydrophilic compounds effective for crosslinking and curing chlorinated polyolefins, acrylic resins, polyester resins, polyurethane resins and like resins, all having carboxy groups. Usable as such hydrophilic oxazoline compounds are a commercial product "Epocros WS-500" (a tradename of Nippon Shokubai Co., Ltd.) and the like.

White Conductive Powder (c)

The conductive primer coating composition of the present invention contain as a conductive filler a white conductive powder (c) comprising white inorganic pigment particles having on their surfaces a tin dioxide ($SnO_2$) covering layer containing tungsten.

The shape of the white inorganic pigment particles may be, for example, granules, approximate spheres, spheres, needles, fibers, columns, cylinders, spindles, plates and the like. Among these, particles in the shape of granules, approximate spheres or spheres are preferable, since these usually have an aspect ratio less than 3, and plastic substrates coated with a primer coating composition prepared using such particles are highly safe to the human body when being recycled.

Further, the white inorganic pigment particles preferably have a mean particle diameter of about 0.05 to about 2.0 μm, and more preferably about 0.1 to about 1.0 μm, in view of dispersibility and other factors.

The type of white inorganic pigment particles is not limited as long as the particles do not undergo a change in shape, decomposition or the like. Examples of usable particles include those of titanium dioxide, aluminium oxide, silicon dioxide, zinc oxide, barium sulfate, zirconium oxide, alkali metal titanates, muscovite, etc.

As the white conductive powder (c), for example, the following can be used: (1) a powder comprising white inorganic pigment particles having on their surfaces a tin dioxide ($SnO_2$) covering layer containing tungsten; (2) a powder comprising white inorganic pigment particles having on their surfaces a tin dioxide ($SnO_2$) layer as an adhesive lower layer, and a tin dioxide ($SnO_2$) covering layer containing tungsten over the lower layer; etc.

In white conductive powders (1) and (2), the proportion of the tungsten-containing tin dioxide covering layer is preferably about 3 to about 150 wt. % calculated as tin dioxide, relative to the weight of white inorganic pigment. A covering layer in a proportion within the above range can impart sufficient conductivity and sufficient brightness to the coating layer of the primer coating composition. More preferably, the proportion of the tungsten-containing tin dioxide covering layer is about 10 to about 120 wt. %.

Further, in the white conductive powder (c), it is preferable that the tungsten-containing tin dioxide covering layer contains tungsten in a proportion of about 0.1 to about 20 wt. %, relative to the weight of tin dioxide in the covering layer. Tungsten in a proportion within the above range can impart sufficient conductivity to the coating layer of the primer coating composition, and does not substantially affect the brightness of the coating layer. More preferably, the proportion of tungsten is about 0.5 to about 15 wt. %.

In white conductive powder (2), the proportion of the lower tin dioxide layer is preferably about 1 to about 15 wt. %, calculated as tin dioxide, relative to the weight of white inorganic pigment. A lower tin dioxide layer in a proportion within the above range can improve the adhesion between the white inorganic pigment particles and the tungsten-containing upper tin dioxide covering layer. More preferably, the proportion of the lower tin dioxide layer is about 3 to about 15 wt. %.

White conductive powder (1) can be prepared, for example, as follows. First, the surfaces of white inorganic pigment particles are covered with a tin salt or stannate containing a tungsten-containing compound by: adding, sequentially or simultaneously, an aqueous tin salt or stannate solution and a tungsten-containing compound dissolved in an alkali or acid to an aqueous suspension of the pigment particles; or adding, sequentially or simultaneously, a tungsten-containing compound dissolved in an aqueous tin salt or stannate solution, and an alkali or acid, to an aqueous suspension of the pigment particles; or other such processes. A suitable pH during this covering process is about 2 to about 9. The coated particles are collected by filtration, dried and heat-treated, to thereby obtain a conductive powder in which the surfaces of the pigment particles are covered with tungsten-containing tin dioxide. The heat treatment is performed preferably in a non-oxidizing atmosphere at about 400 to about 900° C.

White conductive powder (2) can be prepared, for example, as follows. First, the surfaces of white inorganic pigment particles are covered with a tin salt or stannate, by adding, sequentially or simultaneously, an aqueous tin salt or stannate solution and an alkali or acid, to an aqueous suspension of the pigment particles, or other such processes. A suitable pH during the covering process is about 2 to about 9. The covered particles are collected by filtration and dried, and then the tin salt or stannate layer is further covered with a tin salt or stannate containing a tungsten-containing compound by the same procedure as for the preparation of white conductive powder (1). Subsequently, the coated particles are collected by filtration, dried and heat-treated, to thereby obtain a conductive powder in which the pigment particles have a tin dioxide layer on their surfaces as an adhesive lower layer, and a tin dioxide covering layer containing tungsten over the lower layer. The heat treatment is performed preferably in a non-oxidizing atmosphere at about 400 to about 900° C.

Usable tin salts include, for example, tin chloride, tin sulfate, tin nitrate, etc. Usable stannates include, for example, sodium stannate, potassium stannate, etc.

Examples of tungsten-containing compounds include tungstates, metatungstates, paratungstates, tungsten compounds, etc. Examples of tungstates include ammonium tungstate, potassium tungstate, sodium tungstate, etc. Examples of metatungstates include ammonium metatungstate, potassium metatungstate, sodium metatungstate, etc. Examples of paratungstates include ammonium paratungstate, potassium paratungstate, sodium paratungstate, etc. Examples of tungsten compounds include tungsten oxychloride and the like.

Examples of alkalis include sodium hydroxide, potassium hydroxide, sodium carbonate, potassium carbonate, ammonium carbonate, aqueous ammonia, ammonia gas, etc. Examples of acids include hydrochloric acid, sulfuric acid, nitric acid, acetic acid, etc.

White Pigment (d)

The white conductive primer coating composition may further contain (d) a white pigment to improve the whiteness of the coating layer to be obtained.

Usable as the white pigment (d) is, for example, titanium dioxide (rutile titanium dioxide, anatase titanium dioxide or the like), white lead, zinc white, zinc sulfide, lithopone, etc. Among these, titanium dioxide is preferable from the viewpoint of chemical resistance and whiteness. More preferable is rutile titanium dioxide with a mean particle diameter of about 0.05 to about 2.0 µm, and especially about 0.1 to about 1.0 µm.

Formulation of White Conductive Primer Coating Composition

The white conductive primer coating composition of the present invention comprises (a) 100 parts by total weight of a chlorinated polyolefin resin with a chlorine content of 10 to 40 wt. %, and at least one modifier resin selected from the group consisting of acrylic resins, polyester resins and polyurethane resins; (b) about 5 to about 50 parts by weight of a crosslinking agent; (c) about 10 to about 200 parts by weight of a white conductive powder comprising white inorganic pigment particles having on their surfaces a tin dioxide covering layer containing tungsten.

The use of about 5 to about 50 parts by weight of the crosslinking agent (b) results in a coating composition with sufficient curability, and improves film performance characteristics, such as water resistance and the like.

The use of about 10 to about 200 parts by weight of the white conductive powder (c) can impart sufficient conductivity to the coating layer of the primer coating composition, so that another coating composition can be electrostatically applied over the coating layer. Further, such an amount of the white conductive powder does not impair the stability of the coating composition, and achieves excellent brightness, finished appearance and other characteristics of the coating layer.

The amount of the crosslinking agent (b) is preferably about 10 to about 45 parts by weight per 100 parts by weight of the total solids content of the resin component (a). The amount of the white conductive powder (c) is preferably about 50 to about 180 parts by weight per 100 parts by weight of the total solids content of the resin component (a).

As described above, the white conductive primer coating composition of the present invention may further comprise a white pigment (d) to improve the whiteness of the coating layer. The amount of the white pigment (d) is usually about 200 parts by weight or less, preferably about 20 to about 180 parts by weight, and more preferably about 30 to about 130 parts by weight, per 100 parts by weight of the total solids content of the resin component (a).

The white conductive primer coating composition of the present invention can be prepared by dissolving or dispersing the above-mentioned components in an organic solvent, water or a mixture thereof by a known method to adjust the solids content to about 15 to about 60 wt. %. The primer coating composition of the present invention may be an organic solvent-based or aqueous composition, and to achieve low VOC and other advantages, is preferably an aqueous white conductive primer coating composition.

As an organic solvent, the organic solvent used for preparation of each component may be used, or another organic solvent may be added as required.

Organic solvents usable in the composition of the present invention include, for example, methyl ethyl ketone, methyl isobutyl ketone and other ketone solvents; ethyl acetate, butyl acetate and other ester solvents; ethylene glycol monobutyl ether and other ether solvents; isopropyl alcohol, n-butyl alcohol, isobutyl alcohol and other alcohol solvents; n-heptane, n-hexane and other aliphatic hydrocarbon solvents; toluene, xylene and other aromatic hydrocarbon solvents; other solvents such as N-methylpyrrolidone; etc.

Process for Applying White Conductive Primer Coating Composition

Various plastic substrates can be advantageously used as substrates to be coated with the white conductive primer coating composition of the present invention.

Examples of usable plastic substrates include, but are not limited to, various plastic members for use in bumpers, spoilers, grilles, fenders and other automotive exterior panel parts, electrical home appliance exterior panel parts, etc.

The material of the plastic substrate is preferably, but not limited to, a polyolefin obtained by polymerizing at least one $C_{2-10}$ olefin, such as ethylene, propylene, butylene, hexene or the like. Polycarbonates, ABS resins, urethane resins, nylon and other materials are also usable. Such plastic substrates may be subjected to, as required, degreasing, water-washing and/or other treatments beforehand, by known methods.

The white conductive primer coating composition can be advantageously applied, usually after being adjusted to a viscosity of about 12 to about 18 seconds/Ford cup #4/20° C., to a plastic substrate surface by air spray coating, airless spray coating, dip coating or like coating method. The composition is applied to a thickness of about 5 to about 50 μm (when cured), and preferably about 10 to about 45 μm (when cured).

The applied primer coating composition is set or preheated, or cured by heating, to thereby obtain an uncured or cured coating layer that usually has a surface electrical resistance of less than $10^9$ Ω/sq. With a surface electrical resistance of less than $10^9$ Ω/sq., the coating layer can be electrostatically coated with other coating compositions, such as a colored coating composition and/or clear coating composition.

Known heating methods can be used for preheating or curing by heating the coating layer of the white conductive primer coating composition. Examples of usable methods include air blowing, infrared heating, far-infrared heating, induction heating, dielectric heating, etc. The plastic substrate may be heated as required.

The aqueous white primer coating composition of the present invention can form a coating layer with high whiteness, i.e., a lightness (L* value) of 80 or more according to the L*a*b* color system as defined in JIS Z 8729. The lightness is a value measured as follows. The coating composition (A) is applied to a plastic substrate by spray coating to a thickness of about 20 μm (when cured), and cured by heating at about 80 to about 120° C. for about 20 to about 40 minutes, and the lightness (L* value) of the obtained coating layer is measured using a colorimeter. Commercial calorimeters can be used, including, for example, "Color Computer SM-7" (a tradename of Suga Test Instruments Co., Ltd.).

The following 3-coat 1-bake method I and 3-coat 2-bake method II, which use the white conductive primer coating composition of the present invention, can form multilayer coating films with bright color tones on plastic substrate surfaces.

Multilayer Coating Film Forming Method I

A 3-coat 1-bake method for forming a multilayer coating film, comprising the steps of:

(1) applying the white conductive primer coating composition of the present invention to a plastic substrate, usually to a thickness of about 5 to about 50 μm (when cured), and preferably about 10 to about 40 μm (when cured);

(2) electrostatically applying a colored base coating composition to the uncured coating layer of the primer coating composition, usually to a thickness of about 5 to about 30 μm (when cured), and preferably about 10 to about 25 μm (when cured);

(3) electrostatically applying a clear coating composition to the uncured coating layer of the base coating composition, usually to a thickness of about 5 to about 50 μm (when cured), and preferably about 10 to about 40 μm (when cured); and then (4) simultaneously curing by heating the three layers of the primer coating composition, colored base coating composition and clear coating composition.

In method I, the primer coating composition, colored coating composition and clear coating composition, after being applied, may be set or preheated as required. Setting is usually effected by allowing the applied composition to stand at room temperature for about 1 to about 20 minutes. Preheating is usually performed at about 40 to about 120° C., for about 1 to about 20 minutes.

The three-layer coating comprising the primer coating composition, colored base coating composition and clear coating composition can usually be cured by heating at about 60 to about 140° C., for about 10 to about 60 minutes. The curing is preferably performed by heating at about 80 to about 120° C., for about 10 to about 40 minutes.

Multilayer Coating Film Forming Method II

A 3-coat 2-bake method of forming a multilayer coating film, comprising:

(1) applying the white conductive primer coating composition of the present invention to a plastic substrate, usually to a thickness of about 5 to about 50 μm (when cured), and preferably about 10 to about 40 μm (when cured), followed by curing by heating;

(2) electrostatically applying a colored base coating composition to the cured coating layer of the primer coating composition, usually to a thickness of about 5 to about 30 μm (when cured), and preferably about 10 to about 25 μm (when cured);

(3) electrostatically applying a clear coating composition to the uncured coating layer of the base coating composition, usually to a thickness of about 5 to about 50 μm (when cured), and preferably about 10 to about 40 μm (when cured); and then (4) simultaneously curing by heating the two layers of the colored base coating composition and clear coating composition.

In method II, the primer coating composition is usually cured by heating at about 60 to about 140° C., for about 10 to about 60 minutes. The curing is preferably performed by heating at about 80 to about 120° C., for about 10 to about 40 minutes.

Each composition, after being applied, may be set or preheated as required. Setting is usually effected by allowing the applied composition to stand at room temperature for about 1 to about 20 minutes. Preheating is usually performed at about 40 to about 120° C., for about 1 to about 20 minutes.

The two-layer coating consisting of the colored base coating composition and clear coating composition can be usually cured by heating at about 60 to about 140° C., for about 10 to about 60 minutes. The curing is preferably performed by heating at about 80 to about 120° C., for about 10 to about 40 minutes.

In methods I and II, the colored base coating composition may be a coating composition known as a colored coating composition for application as a base coat over a primer coat. Preferably usable are, for example, coating compositions obtained by dissolving or dispersing in water and/or an organic solvent a base resin having carboxy, hydroxy and/or like crosslinkable functional groups, such as an acrylic resin, polyester resin, alkyd resin, urethane resin, epoxy resin or the like; a crosslinking agent, such as a polyisocyanate compound, blocked polyisocyanate compound, melamine resin, urea resin or the like; and a coloring pigment.

Such a colored base coating composition may contain a metallic pigment, mica pigment, extender pigment, dye and/or the like, as required. Among these, a metallic pigment, when used, gives the resulting coating film a dense, metallic appearance, and use of a mica pigment gives the coating film a silky pearl tone.

In methods I and II, the clear coating composition may be a coating composition known as a topcoating clear composition. Preferably usable are coating compositions obtained by dissolving or dispersing in water and/or an organic solvent a base resin having carboxy, hydroxy and/or like crosslinkable functional groups, such as an acrylic resin, polyester resin, alkyd resin, urethane resin, epoxy resin or the like; and a crosslinking agent, such as a polyisocyanate compound, blocked polyisocyanate compound, melamine resin, urea resin or the like.

Such a clear coating composition may contain, as required, a coloring pigment, metallic pigment, extender pigment, dye, UV absorber and/or the like in such an amount that does not impair the transparency.

EFFECT OF THE INVENTION

The present invention accomplishes the following remarkable effects.

(1) The uncured or cured coating layer obtained by applying the primer coating composition of the present invention to a plastic substrate has high conductivity (a surface electrical resistance of less than $10^9$ Ω/sq.). Accordingly, other coating compositions, such as a colored coating composition or/and clear coating composition, can be applied on the primer coating layer by electrostatic coating, which exhibits an excellent deposition efficiency. Thus, the amount of toxic substances emitted to the environment can be greatly reduced.

Further, the coating composition of the present invention can be prepared as an aqueous composition. This can reduce the amount of organic solvent to be discharged to the environment.

(2) When the primer coating composition of the present invention is applied to a plastic substrate and heated, the obtained cured coating layer has high whiteness, i.e., a lightness (L* value) of 80 or more according to the L*a*b* color system defined in JIS Z 8729. Thus, the primer coating layer has little influence on the color properties, such as brightness, of the upper coating layers.

(3) The primer coating composition of the present invention is a thermosetting composition comprising a specific resin component (a) and crosslinking agent (b), and thus has excellent film performance characteristics, such as adhesion to plastic substrates, water resistance, etc.

(4) The multilayer coating film forming method of the present invention can advantageously form a multilayer coating film with a lightness (N value) according to the Munsell color system of 8.0 or more, and even 8.3 or more, by a 3-coat 1-bake or 3-coat 2-bake process.

BEST MODE FOR CARRYING OUT THE INVENTION

Production Examples, Examples and Comparative Examples are given below to illustrate the present invention in further detail. In the following, all parts and percentages are by weight.

PRODUCTION EXAMPLE 1

Production of White Conductive Powder

Two hundred grams of rutile titanium dioxide powder (tradename "KR-310", manufactured by Titan Kogyo K.K., spherical particles with a mean particle diameter of 0.3 to 0.5 μm) was dispersed in pure water to prepare 2 liters of an aqueous suspension, which was then heated to 70° C. Stannic acid solution A obtained by dissolving 69.8 g of stannic chloride ($SnCl_4.5H_2O$) in 500 ml of 3N hydrochloric acid, and alkali solution B obtained by dissolving 3.3 g of sodium tungstate ($Na_2WO_4.2H_2O$) in 500 ml of 5N sodium hydroxide, were simultaneously added dropwise to the aqueous suspension so that the aqueous suspension had a pH of 2 to 3. After completion of the addition, the suspension was filtered, and the residue was washed and dried at 110° C. for 8 hours. The dried product was heat-treated in a nitrogen gas stream (1 liter/minute) at 650° C. for 1 hour, to thereby obtain white conductive powder No. 1 comprising titanium dioxide particles whose surfaces were covered with tin dioxide containing tungsten.

In white conductive powder No. 1, the proportion of the tungsten-containing tin dioxide covering layer was about 20 wt. %, calculated as tin dioxide, relative to the weight of titanium dioxide pigment. The proportion of tungsten in the tungsten-containing tin dioxide covering layer was about 0.08 wt. % relative to the weight of tin dioxide in the covering layer.

PRODUCTION EXAMPLE 2

Production of White Conductive Powder

Two hundred grams of rutile titanium dioxide powder (tradename "KR-310", manufactured by Titan Kogyo K.K., spherical particles with a mean particle diameter of 0.3 to 0.5 μm) was dispersed in pure water to prepare 2 liters of an aqueous suspension, which was then heated to 70° C. To form a lower tin dioxide layer, a 5N sodium hydroxide solution, and stannic acid solution A obtained by dissolving 23.3 g of stannic chloride ($SnCl_4.5H_2O$) in 100 ml of 3N hydrochloric acid were simultaneously added dropwise to the suspension so that the suspension had a pH of 2 to 3. After completion of the addition, the suspension was filtered, and the residue was washed and dried at 110° C. for 8 hours.

The obtained dry powder was dispersed in pure water to prepare 2 liters of an aqueous suspension, which was then heated to 70° C. To form an upper tin dioxide layer containing tungsten, separately prepared stannic acid solution B obtained by dissolving 69.8 g of stannic chloride ($SnCl_4.5H_2O$) in 600 ml of 3N hydrochloric acid, and alkali solution C obtained by dissolving 3.3 g of sodium tungstate ($Na_2WO_4.2H_2O$) in 500 ml of 5N sodium hydroxide, were simultaneously added dropwise to the suspension so that the suspension had a pH of 2 to 3. The subsequent procedures were carried out in the same manner as in Production Example 1, to thereby obtain white conductive powder No. 2 comprising titanium dioxide particles whose surfaces were covered with a tungsten-containing tin dioxide, with an adhesive tin dioxide layer intervening therebetween.

In white conductive powder No. 2, the proportion of tungsten-containing tin dioxide that covered the titanium oxide particles was about 30 wt. %, calculated as tin dioxide, relative to the weight of titanium dioxide pigment. The proportion of tungsten in the tungsten-containing tin dioxide covering layer was about 0.08 wt. % relative to the weight of tin dioxide in the covering layer.

PRODUCTION EXAMPLE 3

Production of Chlorinated Polyolefin Resin for Aqueous Coating Composition

Twelve parts of dimethylethanolamine and 5 parts of a nonionic surfactant (tradename "Noigen EA-140", manufactured by Daiichi Kogyo Yakuhin K.K.) were added to a mixture (50° C.) of 500 parts of a chlorinated polypropylene (grafted with 2.0% maleic acid, chlorine content: 15%, saponification value: 30 mg KOH/g, weight average molecular weight: 80,000), 150 parts of n-heptane and 50 parts of N-methylpyrrolidone. After stirring at the same temperature for 1 hour, 2,000 parts of deionized water was gradually added, and stirring was continued for another hour. Subsequently, 600 parts of n-heptane and deionized water in total was distilled off at 70° C. under reduced pressure, to thereby obtain chlorinated polyolefin emulsion No. 1 with a solids content of 24%.

PRODUCTION EXAMPLE 4

Production of Chlorinated Polyolefin Resin for Aqueous Coating Composition

Using a chlorinated polypropylene (grafted with 1.9% maleic acid, chlorine content: 35%, saponification value: 28 mg KOH/g, weight average molecular weight: 60,000), the procedure of Production Example 3 was followed to obtain chlorinated polyolefin emulsion No. 2 with a solids content of 24%.

PRODUCTION EXAMPLE 5

Production of Acrylic Resin Solution for Aqueous Coating Composition

Forty parts of ethylene glycol monobutyl ether and 30 parts of isobutyl alcohol were placed in a reaction vessel for acrylic resins equipped with a stirrer, thermometer, reflux condenser, etc., and stirred with heating. When the mixture reached 100° C., the following monomer mixture was added over a period of 3 hours.

| | |
|---|---|
| styrene | 10 parts |
| methyl methacrylate | 38 parts |
| n-butyl acrylate | 25 parts |
| 2-hydroxyethyl methacrylate | 20 parts |
| acrylic acid | 7 parts |
| 2,2'-azobisisobutyronitril | 1 part |
| isobutyl alcohol | 5 parts |

After completion of the addition, the resulting mixture was maintained at 100° C. for 30 minutes, and a mixture of 0.5 parts of 2,2'-azobisisobutyronitrile and 10 parts of ethylene glycol monobutyl ether was added dropwise as an additional catalyst solution over a period of 1 hour. After continued stirring at 100° C. for one hour, the mixture was cooled, and 15 parts of isobutyl alcohol was added. When the mixture had cooled to 75° C., 4 parts of N,N-dimethylaminoethanol was added, followed by stirring for 30 minutes, to thereby obtain a solution of hydroxy- and carboxy-containing, water-soluble acrylic resin, with a solids content of 50%. The acrylic resin had a hydroxy value of 86 mg KOH/g, an acid value of 54.5 mg KOH/g and a number average molecular weight of 20,000.

EXAMPLE 1

Production of White Conductive Primer Coating Composition of the Present Invention One hundred and thirty parts of white conductive powder No. 1 was added to 15 parts (solids content) of the acrylic resin solution obtained in Production Example 5, and 150 parts of deionized water and 260 parts of glass beads with a diameter of 1 mm were further added. After stirring for 30 minutes in a shaker-type dispersing machine, the glass beads was removed to thereby obtain a dispersion paste.

Forty parts (solids content) of chlorinated polyolefin emulsion No. 1 obtained in Production Example 3, and 30 parts (solids content) of a urethane emulsion (tradename "Sanprene UX-5100A", manufactured by Sanyo Chemical Industries, Ltd.) were added to the dispersion paste, followed by thorough agitation in a mixer with agitating elements (tradename "TK Pipeline Homo Mixer Model SL", manufactured by Tokushu Kika Kogyo Co., Ltd., agitating element diameter: 40 mm). Further, immediately prior to application, 15 parts (solids content) of a hydrophilized isocyanurate of hexamethylene diisocyanate (tradename "Bayhydur 3100", manufactured by Sumika Bayer Urethane Co., Ltd.) was added, the mixture was thoroughly agitated in the mixer with agitating elements to adjust the viscosity to 15 seconds/Ford cup #4/20° C., thus giving aqueous white conductive primer coating No. 1.

EXAMPLES 2 TO 4

Production of White Conductive Primer Coating Compositions of the Present Invention Following the procedure of Example 1 and using the components shown in Table 1 in the amounts indicated, aqueous white conductive primer coating compositions No. 2 to No. 4 were obtained.

Table 1 shows the amounts of the components of white conductive primer coating compositions of Examples 1 to 4.

TABLE 1

| | Example | | | |
|---|---|---|---|---|
| | 1 | 2 | 3 | 4 |
| White conductive primer coating composition | No. 1 | No. 2 | No. 3 | No. 4 |
| Chlorinated polyolefin emulsion No. 1 | 40 | 40 | | |
| Chlorinated polyolefin emulsion No. 2 | | | 40 | 40 |
| Acrylic resin of Production Example 5 | 15 | 15 | 15 | 15 |
| Urethane emulsion (*1) | 30 | 30 | 30 | 30 |
| Hydrophilized isocyanurate of hexamethylene diisocyanate (*2) | 15 | 15 | 15 | 15 |
| White conductive powder No. 1 | 130 | | 100 | |
| White conductive powder No. 2 | | 150 | | 80 |
| Rutile titanium dioxide (*3) | | | 30 | 50 |

All the amounts in Table 1 are parts by weight of solids contents.

In Table 1, (*1) to (*3) indicate the following.
(*1) Urethane emulsion: tradename "Sanprene UX-5100A", manufactured by Sanyo Chemical Industries, Ltd.
(*2) Hydrophilized isocyanurate of hexamethylene diisocyanate: tradename "Bayhydur 3100", manufactured by Sumika Bayer Urethane Co., Ltd.
(*3) Rutile titanium dioxide: tradename "JR-903", manufactured by TAYCA CORP., spherical particles with a mean particle diameter of 0.4 μm

COMPARATIVE EXAMPLES 1 TO 5

Production of Comparative White Conductive Primer Coating Compositions

Aqueous white conductive primer coating compositions No. 5 to No. 9 were obtained by using the components shown in Table 2 in the amounts indicated, and following the procedure of Example 1.

In Comparative Examples 2 and 3, however, the resin and pigment components were mixed using a mixer with agitating elements in place of the shaker-type dispersing machine, so as to maintain the shape of the needlelike titanium dioxide whose surfaces were covered with tin dioxide/antimony or metal oxide-covered flaky mica.

Table 2 shows the amounts of the components of the white conductive primer coating compositions of Comparative Examples 1 to 5.

TABLE 2

|  | Comparative Example | | | | |
| --- | --- | --- | --- | --- | --- |
|  | 1 | 2 | 3 | 4 | 5 |
| White conductive primer coating composition | No. 5 | No. 6 | No. 7 | No. 8 | No. 9 |
| Chlorinated polyolefin emulsion No. 1 | 40 | 40 | 40 | | |
| Chlorinated polyolefin emulsion No. 2 | | | | 40 | 40 |
| Acrylic resin of Production Example 5 | 15 | 15 | 15 | 15 | 15 |
| Urethane emulsion (*1) | 30 | 30 | 30 | 30 | 30 |
| Hydrophilized isocyanurate of hexamethylene diisocyanate | 15 | 15 | 15 | 15 | 15 |
| Conductive carbon (*4) | 2.5 | | | 2.5 | |
| Needlelike titanium dioxide whose surfaces were covered with tin dioxide/antimony | | 100 | | | |
| Metal oxide-covered flaky mica (*6) | | | 3 | | |
| Rutile titanium dioxide (*3) | 130 | 130 | 130 | 130 | 130 |

All the amounts in Table 2 are parts by weight of solids contents.

In Table 2, (*1) to (*3) indicate the same products as shown above. (*4) to (*6) indicate the following.

(*4) Conductive carbon: tradename "Ketjenblack EC600J", manufactured by Lion Corp.
(*5) Needlelike titanium dioxide whose surfaces were covered with tin dioxide/antimony: tradename "Dentall WK500", manufactured by Otsuka Chemical Co., Ltd.
(*6) Metal oxide-covered flaky mica: tradename "Iriogin 103R", manufactured by Merck Ltd., a non-conductive filler comprising flaky mica covered with a $SnO_2$ lower layer and a $TiO_2$ upper layer formed over the lower layer, mean particle diameter: 22 μm

EXAMPLES 5 TO 9 AND COMPARATIVE EXAMPLES 6 TO 10

Formation of Multilayer Coating Films

Using white conductive primer coating compositions No. 1 to No. 4 of the present invention obtained in Examples 1 to 4, multilayer coating films of Examples 5 to 8 were formed by a 3-coat 2-bake process comprising coating steps 1 and 2 described below. Separately, using primer coating composition No. 3 of the present invention obtained in Example 3, a multilayer coating film of Example 9 was formed by a 3-coat 1-bake process comprising coating steps 1 and 2, in which, however, the primer coating layer was not cured in coating step 1.

Further, using comparative white primer coating compositions No. 5 to No. 9 obtained in Comparative Examples 1 to 5, multilayer coating films of Comparative Examples 6 to 10 were formed by a 3-coat 2-bake process comprising coating steps 1 and 2.

Coating Step 1: Application of White Conductive Primer Coating Layer

Black polypropylene was molded into bumper shapes, degreased, and used as plastic substrates. White conductive primer coating compositions No. 1 to No. 9 were applied to the substrates by air spraying to a thickness of 20 μm (when cured). The applied coating layers were allowed to stand at room temperature for 2 minutes, preheated at 80° C. for 3 minutes, and cured by heating at 120° C. for 20 minutes. The L* value and surface electrical resistance A of the cured coating layers were measured by the methods described hereinbelow.

Coating Step 2: Formation of Multilayer Coating Film Comprising Aqueous Colored Base Coating Composition and Organic Solvent-Based Clear Coating Composition Applied on the White Conductive Primer Coating Layer An aqueous thermosetting translucent colored base coating composition (tradename "WBC-710 Mica Base", manufactured by Kansai Paint Co., Ltd.) was electrostatically applied to the cured coating layer obtained in coating step 1 to a thickness of 15 to 20 μm (when cured) and preheated at 80° C. for 3 minutes. The surface electrical resistance B was then measured by the method described hereinbelow. Subsequently, an organic solvent-based acrylic resin/urethane resin thermosetting clear coating composition (tradename "Soflex #520 Clear", manufactured by Kansai Paint Co., Ltd.) was applied to the uncured colored coating layer to a thickness of 25 μm (when cured), allowed to stand at the room temperature for 5 minutes, and heated at 120° C. for 30 minutes to simultaneously cure the colored coating layer and clear coating layer, thereby giving a multilayer coating film.

The L* value, surface electrical resistance A and surface electrical resistance B were measured by the following methods.

L* value: The coating layer of the white conductive primer coating composition was cured by heating at 120° C. for 20 minutes. The L* value according to the L*a*b* color system defined in JIS Z 8729 of the cured coating layer was measured using a colorimeter (tradename "Color Computer SM-7", manufactured by Suga Test Instruments Co., Ltd.).

Surface electrical resistance A: A white conductive primer coating composition was applied and cured by heating, and the surface electrical resistance of the cured coating layer was measured using an electrical resistance meter (manufactured by TREK, tradename "MODEL 150"). When the measured value is less than $10^9$ Ω/sq., a colored base coating can be electrically applied on the cured coating layer.

Surface electrical resistance B: After applying and curing by heating a white conductive primer coating composition, a portion of the cured coating layer was masked so that the portion would be able to be brought into contact with terminals for measuring the surface electrical resistance after applying a base coating composition to the cured primer coating layer. Subsequently, an aqueous thermosetting translucent colored base coating composition (tradename "WBC-710 Mica Base", manufactured by Kansai Paint Co., Ltd.) was electrostatically applied and preheated at 80° C. for 3 minutes, and the surface electrical resistance of the primer coating layer was measured using an electrical resistance meter (manufactured by TREK, tradename "MODEL 150"). When the measured value is less than $10^9$ Ω/sq., a clear coating can be further applied electrostatically.

Table 3 shows the test results of the multilayer coating films of Examples 5 to 9 formed using the primer coating compositions of the present invention.

TABLE 3

|  | Example | | | | |
| --- | --- | --- | --- | --- | --- |
|  | 5 | 6 | 7 | 8 | 9 |
| White conductive primer coating composition | No. 1 | No. 2 | No. 3 | No. 4 | No. 3 |
| L* value | 82 | 81 | 86 | 88 | — |
| Surface electrical resistance A (Ω/sq.) | $1 \times 10^7$ | $1 \times 10^7$ | $1 \times 10^8$ | $7 \times 10^8$ | $1 \times 10^7$ |
| Surface electrical resistance B (Ω/sq.) | $3 \times 10^7$ | $1 \times 10^7$ | $3 \times 10^8$ | $7 \times 10^8$ | $3 \times 10^7$ |

Table 4 shows the test results of the multilayer coating films of Comparative Examples 6 to 10 formed using the comparative primer coating compositions.

TABLE 4

|  | Comparative Example | | | | |
| --- | --- | --- | --- | --- | --- |
|  | 6 | 7 | 8 | 9 | 10 |
| White conductive primer coating composition | No. 5 | No. 6 | No. 7 | No. 8 | No. 9 |
| L* value | 60 | 78 | 80 | 50 | 93 |
| Surface electrical resistance A (Ω/sq.) | $3 \times 10^6$ | $1 \times 10^6$ | $1 \times 10^{13}$ | $1 \times 10^8$ | $1 \times 10^{13}$ |
| Surface electrical resistance B (Ω/sq.) | $3 \times 10^7$ | $1 \times 10^7$ | — | $1 \times 10^8$ | — |

In Table 4, the surface electrical resistance B of the multilayer coating films of Comparative Examples 8 and 10 was not measurable. This is because, in coating step 2, the colored coating composition and clear coating composition were not able to be electrostatically applied to the coating layers of comparative white conductive primer coating compositions No. 7 and No. 9, since the coating layers had a surface electrical resistance as high as $1 \times 10^{13}$ Ω/sq.

The multilayer coating films obtained in Examples 5 to 9 and Comparative Examples 6, 7 and 9 were tested, by the following methods, for film appearance, N value according to the Munsell color system defined in JIS Z 8721, film performance (adhesion and water resistance), and recyclability.

Film appearance: The perpendicular portion of the coated substrate was checked for abnormalities (sagging, after tack and blistering) of the coating film by the naked eye, and evaluated by the following criteria.

A: none of the above abnormalities was observed; B: one or more of the abnormalities (sagging, after tack and blistering) were observed; C: one or more of the abnormalities (sagging, after tack and blistering) were remarkable.

N value according to the Munsell color system defined in JIS Z 8721: The N value in the Munsell chart of the three-layer coating film consisting of the primer coating layer, colored coating layer and clear coating layer was determined. 0 is black and 10 is pure white.

Adhesion: In the multilayer coating film consisting of three layers, i.e., the primer coating layer, colored coating layer and clear coating layer, cuts reaching the substrate were made with a cutter so as to form 100 squares of a width of 2 mm, and an adhesive tape was adhered to the cut surface, and rapidly peeled off at 20° C. The number of squares remaining was counted and evaluated according to the following criteria.

A: all the squares remained, good adhesion; B: 90 to 99 squares remained, somewhat poor adhesion; C: less than 90 squares remained; poor adhesion.

Water resistance: The multilayer coating film consisting of three layers, i.e., the primer coating layer, colored coating layer and clear coating layer, was immersed in warm water at 40° C. for 240 hours, and cuts reaching the substrate were made in the coating film with a cutter so as to form 100 squares of a width of 2 mm. An adhesive tape was then adhered to the cut surface and rapidly peeled off at 20° C. The number of squares remaining was counted and evaluated according to the following criteria.

A: all the squares remained, good water resistance; B: 90 to 99 squares remained, somewhat poor water resistance; C: less than 90 squares remained, poor water resistance.

Recyclability: The substrate with the multilayer coating film consisting of three layers (the primer coating layer, colored coating layer and clear coating layer) was ground using a grinder into particles with a diameter of about 1 mm or less, and the ground product was observed with an optical microscope. The ground product was checked for conductive filler particles with an aspect ratio of 3 or more, which have adverse effects on the human body. The recyclability was evaluated according to the following criteria.

A: the conductive filler particles contained in the ground product had spherical shapes with an aspect ratio of less than 3, and thus the coated plastic substrate had excellent recyclability;

B: the ground product contained conductive filler particles with an aspect ratio of 3 or more, and thus the coated plastic substrate had poor recyclability.

Table 5 shows the results of the performance test of the multilayer coating films.

TABLE 5

|  | Example | | | | | Comparative Example | | |
| --- | --- | --- | --- | --- | --- | --- | --- | --- |
|  | 5 | 6 | 7 | 8 | 9 | 6 | 7 | 9 |
| Film appearance | A | A | A | A | A | C | B | A |
| N value | 8.3 | 8.0 | 8.7 | 8.9 | 8.7 | 6.0 | 8.5 | 6.0 |
| Adhesion | A | A | A | A | A | B | B | A |
| Water resistance | A | A | A | A | A | C | C | A |
| Recyclability | A | A | A | A | A | A | C | A |

The invention claimed is:

1. A white conductive primer coating composition comprising:
  (a) 100 parts by total weight of a chlorinated polyolefin resin with a chlorine content of 10 to 40 wt. %, and at least one modifier resin selected from the group consisting of acrylic resins, polyester resins and polyurethane resins;
  (b) 5 to 50 parts by weight of a crosslinking agent; and
  (c) 10 to 200 parts by weight of a white conductive powder comprising white inorganic pigment particles having on their surfaces a tin dioxide covering layer containing tungsten;
  in the white conductive powder (c), the proportion of the tungsten-containing tin dioxide covering layer is 3 to 150 wt. % on a tin dioxide basis, relative to the weight of white inorganic pigment;

the composition being capable of forming a coating with a lightness (L* value) of 80 or more as determined according to the L*a*b* color system defined in JIS Z 8729, by being applied to a plastic substrate and cured by heating; and the composition, when formed into an uncured or cured coating applied on a plastic substrate, having a surface electrical resistance of less than $10^9$ Ω/sq.

2. A primer coating composition according to claim 1, wherein, in component (a), the proportions of the chlorinated polyolefin resin and modifier resin are 10 to 90 wt. % and 90 to 10 wt. %, respectively, of the total of these resins.

3. A primer coating composition according to claim 1, wherein the white conductive powder (c) comprises white inorganic pigment particles having a tin dioxide layer on their surfaces and a tin dioxide covering layer containing tungsten on the tin dioxide layer.

4. A primer coating composition according to claim 1, wherein, in the tungsten-containing tin dioxide covering layer in the white conductive powder (c), the proportion of tungsten is 0.1 to 20 wt. % relative to the weight of tin dioxide.

5. A primer coating composition according to claim 1, further comprising (d) up to 200 parts by weight of a rutile titanium dioxide.

6. A primer coating composition according to claim 1, which is an aqueous coating composition.

7. A 3-coat 1-bake method of forming a multilayer coating film, the method comprising the steps of:

(1) applying a white conductive primer coating composition according to claim 1 to a plastic substrate;

(2) electrostatically applying a colored base coating composition on the uncured coating layer of the primer coating composition;

(3) electrostatically applying a clear coating composition on the uncured coating layer of the base coating composition; and then (4) curing by heating the three-layer coating comprising the primer coating composition, colored base coating composition and clear coating composition.

8. A 3-coat 2-bake method of forming a multilayer coating film, the method comprising the steps of:

(1) applying a white conductive primer coating composition according to claim 1 to a plastic substrate, followed by curing by heating;

(2) electrostatically applying a colored base coating composition on the cured coating layer of the primer coating composition;

(3) electrostatically applying a clear coating composition on the uncured coating layer of the base coating composition; and then (4) curing by heating the two-layer coating comprising the colored base coating composition and clear coating composition.

* * * * *